United States Patent [19]

Van der Valk et al.

[11] Patent Number: 4,511,915
[45] Date of Patent: Apr. 16, 1985

[54] COLOR TELEVISION ENCODING CIRCUIT

[75] Inventors: Nicolaas J. L. Van der Valk; Antonius G. Moelands; Peter C. Schmale, all of Breda, Netherlands

[73] Assignee: U.S. Philips Corporation, New York, N.Y.

[21] Appl. No.: 457,610

[22] Filed: Jan. 12, 1983

[30] Foreign Application Priority Data

Jan. 14, 1982 [NL] Netherlands ......................... 8200127

[51] Int. Cl.³ ........................ H04N 9/46; H04N 5/06
[52] U.S. Cl. ...................................... 358/17; 358/150
[58] Field of Search .................... 358/19, 158, 17, 150

[56] References Cited

U.S. PATENT DOCUMENTS 3,590,144  6/1971  Bruch ..................................... 358/17
4,278,994  7/1981  Van der Valk ................. 358/158 X Primary Examiner—John C. Martin
Assistant Examiner—Michael Dunnam
Attorney, Agent, or Firm—Thomas A. Briody; William J. Streeter

[57] ABSTRACT

A color television encoding circuit suitable for use in a color television system in accordance with the NTSC or the PAL-standard. For the purpose of readjusting both the frequency and the phase of the line oscillator the circuit comprises only one control loop incorporating a phase comparison stage for detecting the difference of the phase of the chrominance subcarrier in the chrominance signals with respect to its zero value at the instant at which the leading edge of the synchronizing pulse reaches half the amplitude thereof. The output signal of the phase comparison stage is sampled once in every 2n line periods, where n is an integer, which results in the control signal for the line oscillator.

6 Claims, 3 Drawing Figures

COLOR TELEVISION ENCODING CIRCUIT

The invention relates to a color television encoding circuit suitable for use in a color television system in accordance with the NTSC or the PAL standard. A first oscillator for generating a chrominance subcarrier and a second oscillator for generating a signal of the line frequency is provided, the first oscillator having the frequency stability prescribed by the system standard. The circuit also comprises a pulse circuit for generating a composite synchronizing signal and a modulator circuit for modulating the chrominance subcarrier so as to obtain a chrominance signal.

In accordance with the color television standards, the ratio of the frequency of the chrominance subcarrier to the line frequency has a predetermined value, namely 227.5 for the NTSC and 283.7516 for the PAL standards. In known encoding circuits, in order to obtain this ratio, the frequencies of the two oscillators are locked onto each other, while a good frequency stability ensures that the ratio remains substantially constant in all circumstances. In accordance with a more recent standard for the NTSC standard (RS 170A) there must also be a fixed phase relationship, with the proviso that the reference chrominance subcarrier have a zero-crossing at the 50% point of the leading edge of all the synchronizing pulses. A reference chrominance subcarrier must here be understood to mean a continuous signal having the same instantaneous phase as the chrominance subcarrier burst (color synchronizing signal). For the PAL standard such a relationship is at present only a proposal (E.B.U. Doc. 11/22E, 23E and 25E), which imports that the phase of the $E'_u$- component of the chrominance subcarrier burst which is extrapolated to the 50% point of the leading edge of the line synchronizing pulse of line 1 of field 1 must be zero.

The invention has for its object to provide an encoding circuit of the above-described type, wherein both the frequency and the phase relationship requirements are satisfied with simple means. According to the invention, the color television encoding circuit for readjusting both the frequency and the phase of the second oscillator comprises only one control loop which loop incorporates a phase comparison stage for detecting during operation the difference of the phase of the chrominance subcarrier with respect to its zero value at the instant at which the leading edge of the synchronizing pulse reaches half the amplitude thereof, this phase comparison stage having a first input terminal for receiving the chrominance signal, a second input terminal for receiving the composite synchronizing signal, and an output terminal supplying a sample-and-hold circuit. A sampling operation is effected once per 2n line periods, wherein n is an integer, said sample-and-hold circuit producing a control signal for the second oscillator.

It should be noted that United States Pat. No. 4,278,994 discloses an encoding circuit comprising a phase control loop for readjusting the phase of the second oscillator, the phase comparison being performed once in every 2n line periods. However, this prior art encoding circuit also comprises a second control loop for readjusting the frequency of the second oscillator, the control voltages obtained being added together. In contrast therewith, the present invention is based on the recognition that it is possible to satisfy the two desired relationships by means of one single control loop, which results in a considerable simplification. It is a further recognition of the invention that the phase comparison must not be between the signals of the oscillators, but between the chrominance and synchronizing signals. These signals are indeed derived from the oscillator, but the interposed stages introduce delays which are generally variable and the more so with temperature fluctuations. In accordance with the invention the phase relationship is realized in a place where the color television signal has already been encoded, and more specifically by means of the composite synchronizing signal which is added to the encoded signal, which implies an automatic compensation of the said delays. Preferably, the encoding circuit in accordance with the invention includes a blanking circuit connected to the modulator circuit so as to obtain the chrominance signal with a burst which occurs during the period of time prescribed by the standard, the first input terminal of the phase comparison stage being connected to the connection so formed.

In view of the required accuracy, the phase comparison stage must be constructed with a great deal of care. For this purpose, the encoding circuit in accordance with the invention includes an output signal of the phase comparison stage which can only assume two values, namely a first value at a positive phase of the chrominance subcarrier at the instant at which the leading edge of a synchronizing pulse reaches half the amplitude thereof, and a second value at a negative phase of the chrominance subcarrier at said instant.

An encoding circuit in accordance with the invention which is suitable for use in a color television system in accordance with the PAL standard, is characterized in that the number n is even and in that the output of the sample-and-hold circuit is connected to a first input terminal of a second phase comparison stage. The second input terminal of the phase comparison stage receives a signal of the picture frequency and has an output terminal which produces the control signal. Advantageously, the circuit includes means for rendering the second comparison stage inoperative when the control signal exceeds a predetermined value.

The invention will now be further described by way of example with reference to the accompanying Figures.

DESCRIPTION OF THE PREFERRED EMBODIMENTS

Figure 1:
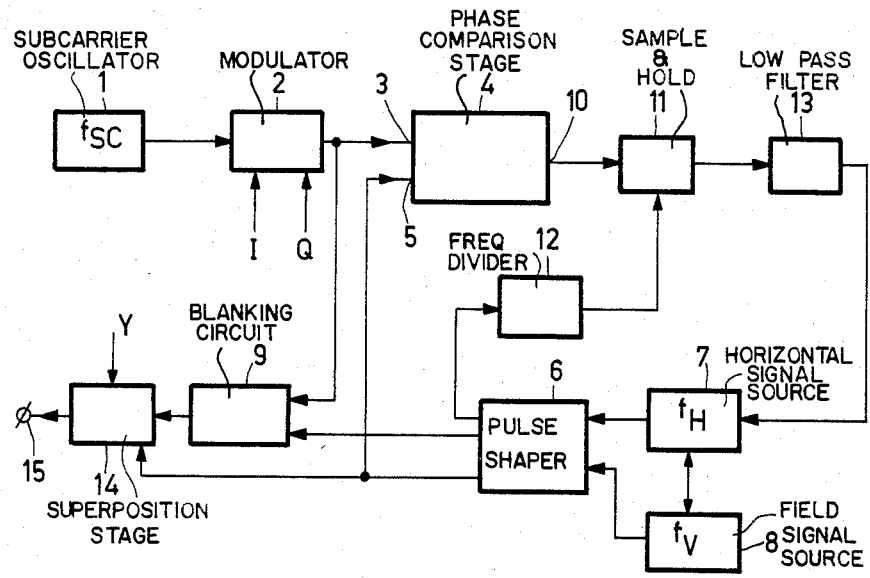
FIG. 1 shows a block schematic circuit diagram of a portion of an encoding circuit for the NTSC standard.

In FIG. 1, reference numeral 1 denotes a subcarrier oscillator. The sinusoidal signal produced thereby has the frequency $f_{SC}=3.579545$ MHz prescribed by the NTSC standard and is applied to a modulator circuit 2 which is supplied with I and Q-signals generated in known manner. The chrominance signal obtained in a known manner by means of circuit 2 is applied to an input terminal 3 of a phase comparison stage 4. A composite synchronizing signal obtained from a pulse shaper 6 is present at a second input terminal 5 of stage 4. For this purpose pulse shaper 6 is supplied with a signal of the line frequency generated by a line oscillator 7, which signal is a sinusoidal signal having the line frequency $f_H=15.734265$ KHz, as well as a signal of the field frequency which is generated by a field signal source 8 and has a frequency equal to $f_v=(2/525)f_H$. The signal on terminal 5 contains line synchronizing pulses whose edges have the prescribed slope and which follow each other after the prescribed time intervals. Oscillators 1 and 7 are of a very stable type, for example crystal oscillators. Oscillator 1 has moreover a compensation for variations which may be caused by temperature fluctuations. Thus, the frequency stability thereof is of the order of 1 to $10^6$, while the frequency stability of oscillator 7 is of the order of 1 to $10^5$.

Modulator circuit 2 is of such a construction that the chrominance subcarrier is present during the line blanking interval. The signal from circuit 2 is applied to a blanking circuit 9, which is further supplied with a line blanking signal produced by pulse shaper 6. The signal obtained by means of circuit 9 is a chrominance signal in accordance with the NTSC standard, the chrominance subcarrier consequently being available during the line blanking interval only during the prescribed burst interval. For a construction of modular circuit 2 and blanking circuit 9 reference is made to Applicant's non-published Netherlands Patent Application No. 8 102 618 (PHN 10.069).

The chrominance signal obtained by means of circuit 9 is applied to a superposition stage 14 to which also a luminance signal Y and the composite synchronizing signal of pulse shaper 6 are applied. The output signal of stage 14 is the composite video signal which is available at the output terminal 15 of the encoding circuit.

By means of phase comparison stage 4, the phase is compared between the two input signals thereof. In accordance with the standard, the chrominance subcarrier signal on terminal 3 must have a zero-crossing at the 50% point of the leading edge of the line synchronizing pulse. If the phase deviates therefrom, that is to say if the zero-crossing of the chrominance subcarrier signal does not occur at the instant at which the pulse has reached half its amplitude, then a voltage which is representative of the deviation is present at the output terminal 10 of stage 4. This voltage is applied to a sample-and-hold circuit 11, which is operated by a switching signal produced by a frequency dividing circuit 12. For that purpose circuit 12 is supplied with a signal of the line frequency coming from pulse shaper 6 and divides the frequency thereof by two. The control voltage present on the output of circuit 11 is smoothed by means of a low-pass filter 13 and the smoothed voltage is applied to oscillator 7 for readjusting it. So using the described control loop a phase deviation determined by stage 4 results in the readjustment of oscillator 7. In response thereto the frequency of the signal generated by said oscillator varies, which results in a shift of the synchronizing pulse applied to terminal 5, namely until the 50% point of the leading edge thereof coincides with the zero-crossing of the chrominance subcarrier applied to terminal 3.

The standard prescribes that the ratio between the frequencies $f_{SC}$ and $f_H$ be equal to 227.5. This number is equal to (455/2), which is an odd number divided by 2, which as known results in a phase difference of 180° between the subcarrier at a determined instant and the same carrier at the corresponding instant in the subsequent line period. This is the reason why sampling by means of circuit 11 is effected at half the line frequency, that is to say once in every two line periods. The control loop has a determined stable control point, which is the point of the control characteristic at which the loop readjusts itself after a disturbance in its equilibrium. In this point the subcarrier passes through the zero value in a determined direction. So if, due to the operation of the loop the zero-crossing of the subcarrier coincides every second line with the 50% point of the leading edge of the line synchronizing pulse then it may be assumed that the ratio between the frequencies $f_{SC}$ and $f_H$ is equal to an integer divided by two. In view of the described frequency stability of oscillators 1 and 7, this number cannot be other than 455, as the number 454 or 456 or a still lower or higher number would imply a tolerance of more than 1 to 455, which is approximately 0.2%, which exceeds the tolerance with which the oscillators operate. So by the action of the control loop shown in FIG. 1, both the phase and the frequency relationships are accurately satisfied, so that an additional frequency coupling between the two oscillators is superfluous. In addition, if the frequency of the chrominance subcarrier oscillator is defined with a certain, close tolerance, then the frequency of the line oscillator is defined with the same tolerance without the necessity for the line oscillator to be of the same degree of accuracy. This is the case if the subcarrier oscillator operates in accordance with the standard, which standard allows a deviation of 10 Hz, i.e. a tolerance of approximately $2.10^{-6}$. This requirement is many times more stringent than the requirement imposed on the ratio.

During operation it may happen, for example due to temperature effects, that the phase relationship between oscillators 1 and 7 is lost, that is to say the zero value of the chrominance subcarrier does not occur at the instant at which the line synchronizing pulse reaches half its amplitude, while both frequencies continue to maintain substantially the correct values. Owing to the action of the described control loop, the frequency of oscillator 7 is then changed. So this frequency deviates from the prescribed value during the phase shift. As the chrominance subcarrier frequency must have a very high stability, preference should be given to a control in which, as described, oscillator 1 is not controlled while oscillator 7 is controlled.

In FIG. 1 the phase between the signals produced by oscillators 1 and 7 is compared, after modualtion, by means of circuit 4 and prior to suppression by means of blanking circuit 9. It will be obvious that this phase comparison may be effected in a different place in the circuit, for example between oscillator 1 and pulse shaper 6. However, this has the disadvantage that the stability and in particular the temperature stability of the subsequent stages must be of such a high quality that delays introduced by these stages are constant, especially in the event of temperature fluctuations. In FIG. 1 the phase relationship is realized in a place where the color television signal has already been encoded, more specifically by means of the composite synchronizing signal which is added to the encoded signal in stage 14, which implies an automatic compensation of the delays. The superfluous information introduced by this synchronizing signal during the field blanking interval is removed by means of circuit 11. As stage 4 is continuously in operation, the signal thereof is not affected. It will be obvious that sampling by means of circuit 11 need not be effected every second line but that in known manner every $2n^{th}$ line may be sampled, wherein n is an arbitrary, but not too high, integer. As a result of this a further requirement is imposed on oscillator 7 but this requirement can be easily satisfied.

Phase comparator stage 4 comprises (see FIG. 2) a differential amplifier incorporating two npn transistors 21 and 22. The base of transistor 21 is adjusted to a d.c. voltage of 0.5 V and the alternating current is connected to terminal 3, while the base of transistor 22 is directly connected to terminal 5. Both emitters are interconnected and connected to a current source 23. The collector of transistor 21 is connected through resistor 24 to a voltage supply source of 5 V and the collector of transistor 22 is connected to said supply voltage source through resistor 25. The pulse at terminal 5 are positive going pulses and between the edges thereof the voltage at terminal 5 is either 0 or 1 V.

If the zero-crossing of the sine wave at terminal 3 coincides with the 50%-point of the leading edge of the pulse on terminal 5, and if the sine wave passes through the zero value in the negative direction, then transistors 21 and 22 conduct to the same extent at the instant at which the leading edge reaches said point, while transistor 21 is more conductive prior to this instant and transistor 22 is more conductive after this instant. A positively going pulse which is applied to the base of an npn-transistor 26 is present on the collector of transistor 21 and a negatively going pulse which is applied to the base of an npn-transistor 27 is present on the collector of transistor 22. The amplitude of the sine wave must be less than 1 V. Actually, the sine wave reaches the zero value somewhat earlier or somewhat later than the instant at which the pulse reaches the 50%-point. The edges of the pulses on the collectors of transistors 21 and 22 consequently occur at instants which depend on the phase difference between the signals on terminals 3 and 5.

The emitters of transistors 26 and 27 are interconnected and connected to the collector of an npn-transistor 28. The emitter thereof is connected to the emitter of a further npn-transistor 29 and to a current source 30. The base of transistor 28 is connected to a positive d.c. voltage while the base of transistor 29 is connected to terminal 5. The emitters of two npn-transistors 31 and 32 are interconnected and connected to the collector of transistor 29. The collector of transistor 27 is connected to the base of transistor 31 and to the collector of transistor 32 and the junction point A formed is connected to the voltage supply source through a resistor 34. In a similar manner the collector of transistor 26 is connected to the base of transistor 32 and to the collector of transistor 31 and the junction point B formed is connected to the voltage supply source through a resistor 33.

During the occurrence of the pulse at terminal 5 transistor 28 does not conduct and transistor 29 conducts. Before the leading edge of this pulse the situation is just the opposite and at the instant of the 50%-point of the leading edge both transistors conduct to the same extent. Prior to and at said instant, transistors 26 and 27 amplify the signals applied to their bases. Transistors 31 and 32 form a flip-flop which is in operation during the occurrence of the pulse on terminal 5 and is brought at the said instant to the state determined by the higher one of the voltages in points A and B at the instant of the 50%-point. This situation is maintained after said instant. Owing to the cumulative character of the change of state of the flip-flop, a positively going pulse occurs at point A or a negatively going pulse at point B, even in the event that the phase deviation detected by the differential amplifier 21, 22 is very small. The supply voltage is present on the point B or A, depending on which of these points such a pulse does not occur. The difference between the voltages at points A and B is amplified by a differential amplifier formed by two npn-transistors 35 and 36 and a current source 37. The collector of transistor 36 is connected to the base of a pnp-transistor 38, whose emitter is connected to the supply voltage while the collector is connected to a collector resistor 39 and to terminal 10. Transistor 38 operates as a switch on the base of which there is either a negatively going pulse or a voltage which is substantially equal to 5 V. In the first case transistor 38 conducts so that a positive going pulse having an amplitude of approximately 5 V is available on terminal 10. In the other case transistor 38 does not conduct and the voltage at terminal 10 is equal to zero.

From the foregoing it appears that the signal produced by stage 4 can only assume two values in dependence on the sign of the sine wave on terminal 3 at the instant at which the leading edge of the pulse at terminal 5 exceeds half the amplitude thereof. A voltage difference determined by transistors 21 and 22 is used as a criterion. So, during operation a sequence of pulses having an amplitude of approximately 5 V is present on terminal 10. This digital signal is much more reliable than the signal produced by an analog phase detector whose value continuously varies as a function of the phase deviation between the input signals, it being a requirement that this value must be nominal when the phase deviation is zero. In view of the high frequency and the nature of the signals to be compared, namely a sine wave against a pulse, a stable analog phase detector would be very difficult to realize: a phase deviation of, for example, 5° corresponds to approximately 4 ns.

Figure 2:
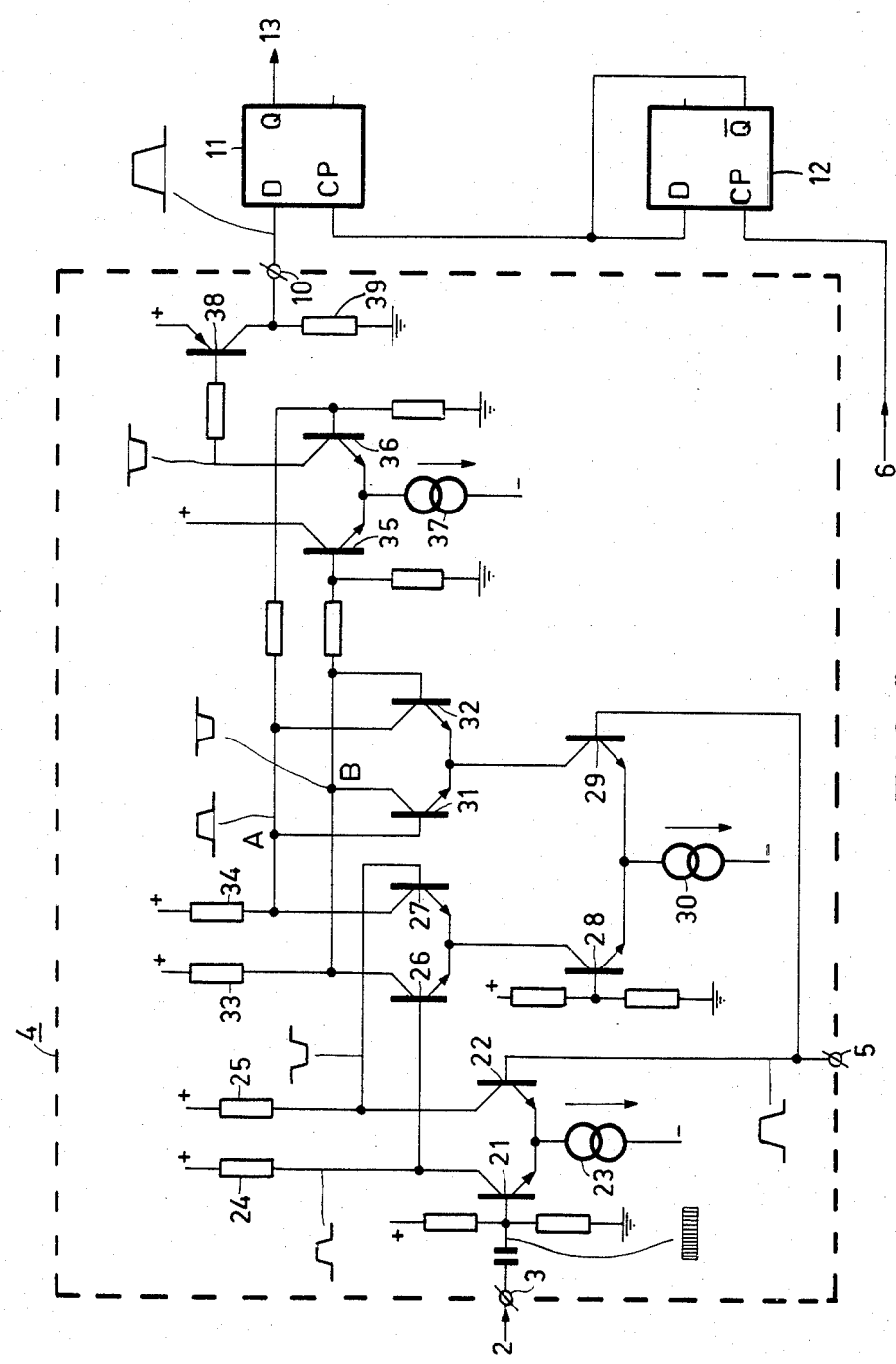
FIG. 2 shows a more detailed circuit diagram of a portion of the encoding circuit of FIG. 1.

In the embodiment shown in FIG. 2, frequency dividing circuit 12 is in the form of a D-flip-flop to which a pulse of the line frequency is applied as a clock signal and whose D-input is connected to the to output. The leading edge of the clock pulse occurs after the leading edge of the corresponding pulse at terminal 5 but prior to the center instant of this pulse. This measure ensures that no equalizing pulses are skipped. Sample-and-hold circuit 11 is in the form of a D-flip-flop having the signal of half the line frequency of circuit 12 as a clock signal. The D-input is connected to terminal 10. At the Q-output, which is connected to filter 13 a value is present which is equal to the value on terminal 10 during the first half of each second pulse at the clock input of circuit 12. As a result thereof the synchronizing signal structure which has a field component which is present on terminal 10, is removed.

If the control loop has not yet been pulled-in, then it may happen that the sign of the phase deviation between the signals on terminals 3 and 5 does not change during a number of line periods so that the signal at the Q-output of flip-flop 11 also does not change. In these circumstances this signal is a square-wave signal whose repetition rate is equal to the difference frequency between the frequency of the oscillator 7 and the desired frequency. The control voltage smoothed by filter 13 is a low-frequency voltage. After pulling-in of the control loop, the rate at which the sign of the phase deviation changes is higher and the repetition rate becomes higher. In the final state the phase deviation continuously varies between a low positive and a low negative value. The signal at the Q-output of flip-flop 11 is consequently a logic 0 during a period of the clock signal and a logic 1 during the period subsequent thereto, so it is a square-wave signal whose frequency is equal to a quarter part of the line frequency and which is smoothed to a d.c. voltage having a very small ripple. Consequently, the frequency of oscillator 7 varies very little.

Figure 3:
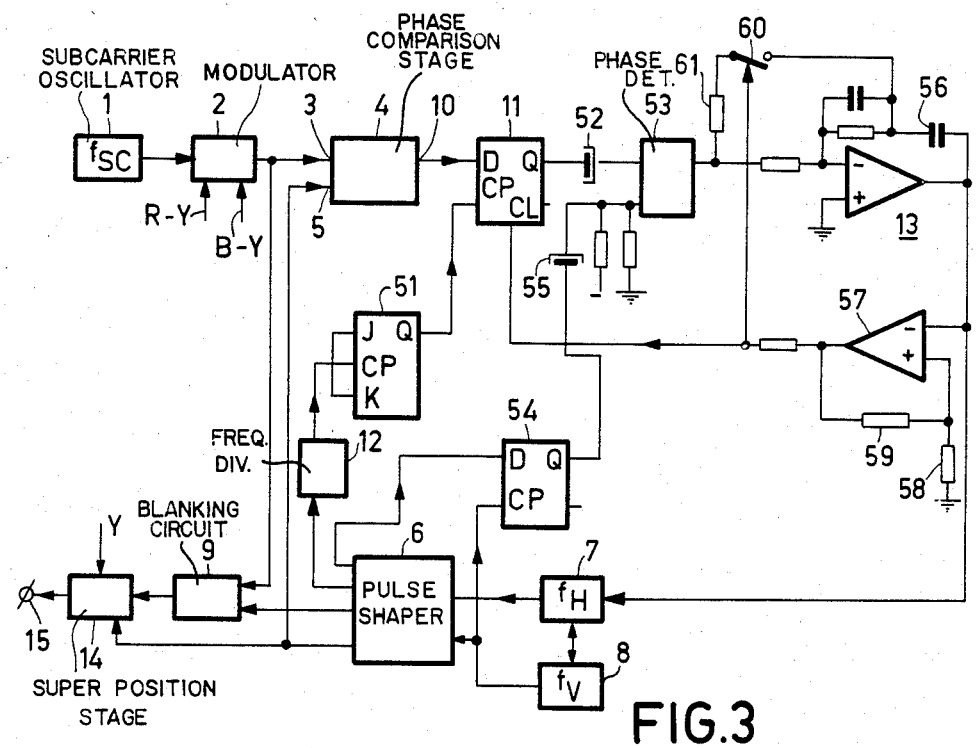
FIG. 3 shows a block schematic circuit diagram of a portion of an encoding circuit for the PAL standard.

FIG. 3 shows a portion of an encoding circuit suitable for the PAL standard and wherein by means of a single control loop both the phase and the frequency of the line oscillator are readjusted. In FIG. 3 the same elements as shown in FIG. 1 and in FIG. 2 are denoted by the same reference numerals. As the ratio between frequencies $f_{SC}$ and $f_H$ is now equal to approximately 283.75, namely (1135/4), the sampling action by means of circuit 11 must now be effected once in every 4 line periods or in general every $4n^{th}$ line. This implies that the tolerance of the oscillators must not exceed 1 to 1135, i.e. approximately 0.09%. This requirement is stricter than for the NTSC-standard but can be accomplished by means of, for example, crystal oscillators.

In FIG. 3 the modulation signals for modulator circuit 2 are the difference signals R-Y and B-Y. The output signal of dividing circuit 12 is the PAL-identification signal for determining the sequence of the signals in circuit 2. The frequency thereof is divided by two by means of a JK-flip-flop 51. If the phase relationship between oscillators 1 and 7 is correct, then the frequency of the signal at the Q-output of flip-flop 11 is equal to 25 Hz owing to the 25 Hz-offset of the PAL-standard. This output signal is applied to the first input of a phase detector 53 through capacitor 52.

By means of a D-flip-flop 54 a signal is generated which has the picture frequency, namely 25 Hz, and is supplied to the second input of phase detector 53 through capacitor 55. This signal is positive for the first field of each picture. The action of the control loop ensures that the leading edges of both input signals of phase detector 53 which are both positive-going edges occur substantially simultaneously. The control voltage smoothed by loop 13 is supplied to oscillator 7. Filter 13 comprises a capacitor 56. At switch-on of the encoding circuit it may happen that the detuning of oscillator 7 with respect to the nominal frequency thereof is more than 25 Hz. If this detuning has the incorrect sign relative to the desired 25 Hz-offset then the control loop will adjust itself to an incorrect value. This effect is prevented from occurring in that the smoothed control voltage is also applied to the inverting input of an amplifier 57, the non-inverting input of which is connected to ground through a resistor 58 and to the output through a resistor 59. Components 57, 58, and 59 form a Schmitt trigger circuit. If the smoothed control voltage is higher than a predetermined value, determined by resistors 58 and 59, then the output voltage of amplifier 57 is not equal to zero. This voltage resets flip-flop 11 while a switch 60 is operated to discharge capacitor 56 by means of a resistor 61 having a comparatively low value, whereafter pull-in is possible and the output voltage of amplifier 57 becomes zero.

It should be noted that the circuit in FIG. 3 is suitable for the PAL and the PAL-N-standard which prescribe a picture frequency offset. For the PAL-M-standard for which it holds that $f_{SC}=227.25f_H$, so without offset, FIG. 3 can be simplified by omitting phase detector 53 and Schmitt trigger 57 and associated components.

What is claimed is:

1. A color television encoding circuit for use in a television system of the NTSC or PAL standard, comprising:
   a first oscillator for generating a chrominance subcarrier signal having a frequency stability prescribed by one of said standards;
   a second oscillator for generating a line frequency signal;
   a pulse circuit for generating a composite synchronizing signal;
   a modulator circuit for modulating the chrominance subcarrier signal to generate a chrominance signal;
   a signal control loop for adjusting the phase and frequency of the second oscillator, including:
   a phase comparison stage having first and second input terminals for receiving the chrominance signal and composite synchronizing signal, respectively, and an output terminal, said stage detecting during operation the difference of the phase of the chrominance subcarrier signal with respect to the zero value at the instant at which the leading edge of the synchronizing pulse reaches half the amplitude thereof, and
   a sample and hold circuit connected to said phase comparison stage output terminal and said second oscillator, said sample and hold circuit sampling once per 2n line periods, where n is an integer, to produce a control signal for said second oscillator frequency.

2. A circuit as claimed in claim 1, further comprising a blanking circuit connected to the modulator circuit so as to obtain the chrominance signal with a color burst which occurs during the period of time prescribed by the standard, the first input terminal of the phase comparison stage being connected to the connection so formed.

3. A circuit as claimed in claim 7, wherein the output signal of the phase comparison stage can only assume two values, a first value at a positive phase of the chrominance subcarrier at the instant at which the leading edge of a synchronizing pulse reaches half the amplitude thereof, and a second value at a negative phase of the chrominance subcarrier at said instant.

4. A circuit as claimed in claim 3, wherein the phase comparison stage comprises a differential amplifier for comparing the amplitude of the signals on the first and second input terminals and a bistable element which is active during the occurrence of a synchronizing pulse.

5. A circuit as claimed in claim 7, suitable for use in a color television system in accordance with the PAL-standard, wherein the number n is even and the output of the sample-and-hold circuit is connected to a first input terminal of a second phase comparison stage which has a second input terminal for receiving a signal of the picture frequency, and whose output terminal supplies the control signal.

6. A circuit as claimed in claim 5, further comprising means for rendering the second comparison stage inoperative when the control signal exceeds a predetermined value.

* * * * *